United States Patent
Kyle, Jr. et al.

(10) Patent No.: US 10,521,744 B2
(45) Date of Patent: Dec. 31, 2019

(54) METHODS AND SYSTEMS FOR SALES TRACKING USING MOBILE DEVICES

(71) Applicant: Vendor Credentialing Service LLC, Houston, TX (US)

(72) Inventors: Garry Wayne Kyle, Jr., Flower Mound, TX (US); Richard Jan Pleczko, Houston, TX (US)

(73) Assignee: Vendor Credentialing Service LLC, Houston, TX (US)

( * ) Notice: Subject to any disclaimer, the term of this patent is extended or adjusted under 35 U.S.C. 154(b) by 577 days.

(21) Appl. No.: 14/823,915

(22) Filed: Aug. 11, 2015

(65) Prior Publication Data

US 2017/0046649 A1    Feb. 16, 2017

(51) Int. Cl.
*G06Q 10/06* (2012.01)

(52) U.S. Cl.
CPC ............................. *G06Q 10/063114* (2013.01)

(58) Field of Classification Search
CPC .............................................. G06Q 10/063114
See application file for complete search history.

(56) References Cited

U.S. PATENT DOCUMENTS

| | | | |
|---|---|---|---|
| 2013/0275329 A1* | 10/2013 | Starr | G06Q 10/00 705/345 |
| 2013/0290154 A1 | 10/2013 | Cherry et al. | |
| 2013/0325495 A1* | 12/2013 | Hempstead | G06Q 10/063114 705/2 |
| 2014/0236663 A1* | 8/2014 | Smith | G06Q 10/0633 705/7.27 |
| 2014/0244437 A1* | 8/2014 | Longino | G06Q 30/0613 705/26.41 |
| 2015/0006213 A1* | 1/2015 | Heier | G06Q 10/063116 705/7.16 |
| 2015/0081487 A1* | 3/2015 | Porter | G06Q 50/22 705/32 |

(Continued)

FOREIGN PATENT DOCUMENTS

JP     2005202572 A     7/2005
JP     2007148902 A     6/2007

(Continued)

*Primary Examiner* — Sujay Koneru
(74) *Attorney, Agent, or Firm* — Park, Vaughan, Fleming & Dowler LLP (57) ABSTRACT

Embodiments of methods and systems for sales tracking using mobile devices are described. In an embodiment, a method may include an employee interface device registering a sign-in entry in an internet-based tracking database in response to an application of the employee interface device determining that a location module of the employee interface device is within a pre-defined range of one of multiple pre-defined locations of interest, and that the location module has remained within the pre-defined range of one of the multiple pre-defined locations of interest for a pre-defined time period. In an embodiment, the employee interface device may register a sign-out time of the sign-in entry in the internet-based tracking database in response to the application of the employee interface device determining that the location module has moved outside the pre-defined range, and that the location module has remained outside the pre-defined range for the pre-defined time period.

10 Claims, 5 Drawing Sheets

(56) References Cited

U.S. PATENT DOCUMENTS

| | | | | |
|---|---|---|---|---|
| 2015/0161553 A1* | 6/2015 | Eggleston | ...... | G06Q 10/063114 705/7.15 |
| 2015/0235162 A1* | 8/2015 | Rungta | .......... | G06Q 10/063114 705/7.15 |
| 2015/0327011 A1* | 11/2015 | Fairbanks | ................ | G07C 1/10 455/456.3 |
| 2015/0332289 A1* | 11/2015 | Arroyo | .............. | G06Q 30/0201 705/7.29 |
| 2015/0347955 A1* | 12/2015 | Fairbanks | ...... | G06Q 10/063116 705/7.16 |
| 2015/0348146 A1* | 12/2015 | Shanmugam | ...... | G06Q 30/0603 705/71 |
| 2015/0348214 A1* | 12/2015 | Jain | ...................... | G06Q 40/125 705/14.58 |
| 2015/0363745 A1* | 12/2015 | Hatch | ................ | G06Q 10/1091 705/32 |
| 2016/0005048 A1* | 1/2016 | Grigg | ...................... | H04W 4/21 705/304 |
| 2016/0189132 A1* | 6/2016 | Cash | ................ | G06Q 20/3224 705/14.57 |
| 2016/0364790 A1* | 12/2016 | Lanpher | .............. | G06Q 30/0637 |
| 2016/0366152 A1* | 12/2016 | Jackson | ................ | H04W 4/21 |
| 2017/0055113 A1* | 2/2017 | Kusens | ................... | G01S 1/042 |
| 2018/0253805 A1* | 9/2018 | Kelly | ................... | G06Q 20/204 |

FOREIGN PATENT DOCUMENTS

| | | |
|---|---|---|
| JP | 2009145980 A | 7/2009 |
| KR | 1020100108748 A | 10/2010 |

\* cited by examiner

METHODS AND SYSTEMS FOR SALES TRACKING USING MOBILE DEVICES

FIELD

This disclosure relates generally to computer systems, and more specifically, to methods and systems for sales tracking using mobile devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Sales managers of vendor companies employ sales agents who visit customer sites in order to represent the vendor company and thereby increase sales volume. Sales managers typically track the work done by sales agents in order to assess the effectiveness of the agents and the market adoption of various products sold by the vendor company. Conventional methods of monitoring sales agents may include weekly meetings or telephone calls to discuss various account visits. Other conventional methods of monitoring sales agents include requiring the agents to manually enter data from their account visits into a tracking system. These existing methods are inefficient and time consuming since they require the sales agents to allocate a portion of their valuable time, which could otherwise be spent focusing on customers, to manual administrative activities.

SUMMARY

Methods and systems for sales tracking using mobile devices are described. In one embodiment, a method may include an employee interface device registering a sign-in entry in an internet-based tracking database in response to an application of the employee interface device determining that a location module of the employee interface device is within a pre-defined range of one of multiple pre-defined locations of interest, and that the location module of the employee interface device has remained within the pre-defined range of one of the multiple pre-defined locations of interest for a pre-defined time period. In an embodiment, a method may include the employee interface device registering a sign-out time of the sign-in entry in the internet-based tracking database in response to the application of the employee interface device determining that the location module of the employee interface device has moved outside the pre-defined range of one of the multiple pre-defined locations of interest, and that the location module of the employee interface device has remained outside the pre-defined range of one of the multiple pre-defined locations of interest for the pre-defined time period. Additionally, the sign-in entry may include a location name corresponding to one of the multiple locations of interest, an amount of time the employee interface device spent within the pre-defined range of the corresponding location of interest, and a user-editable sales notes field. In one embodiment, the user-editable sales notes field may be configured to be automatically uploaded to a Customer Relationship Management (CRM) system by the internet-based tracking database.

In an embodiment, a method for sales tracking using mobile devices may include a manager interface device reading multiple sign-in entries from the internet-based tracking database. Additionally, a method may include an internet-based application sending a real-time proximity alert to a site administrator of a pre-defined location of interest in response to the employee interface device registering a sign-in entry corresponding to the pre-defined location of interest. In various embodiments, the pre-defined range may include fifty (50) feet, and the pre-defined time period may include fifteen (15) minutes.

In one embodiment, a system for sales tracking using mobile devices may include an internet-based tracking database and an employee interface device, which may include an application and a location module. In an embodiment, the employee interface device may be configured for registering a sign-in entry in the internet-based tracking database in response to the application of the employee interface device determining that the location module of the employee interface device is within a pre-defined range of one of multiple pre-defined locations of interest, and that the location module of the employee interface device has remained within the pre-defined range of one of the multiple pre-defined locations of interest for a pre-defined time period.

In one embodiment, an apparatus for sales tracking using mobile devices may include an internet-based tracking database and an employee interface device, which may include an application and a location module. In an embodiment, the employee interface device may be configured for registering a sign-in entry in the internet-based tracking database in response to the application of the employee interface device determining that the location module of the employee interface device is within a pre-defined range of one of multiple pre-defined locations of interest, and that the location module of the employee interface device has remained within the pre-defined range of one of the multiple pre-defined locations of interest for a pre-defined time period.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of methods and systems for sales tracking using mobile devices are described. In an embodiment, a smart phone of a sales agent (i.e., sales representative) may automatically sign-in at a predetermined location (e.g., a customer site) when the sales agent's phone has been within a predetermined range of the predetermined location for a predetermined period of time (i.e., when the sales agent arrives at the customer site), and then the smart phone may automatically sign-out from the location when the sales agent's smart phone has been outside of a predetermined range from the predetermined location for a predetermined period of time (e.g., when the sales agent leaves the customer site).

In one embodiment, an internet-based (i.e., web-based) software application utilizes data received from one or more employee interface devices, such as smart phones or other mobile devices that are each equipped with an application and a location module, to track the activity of one or more sales agents who carry the phones and then generate analytical reports that may be viewed by a sales manager. The mobile application may be configured to include a list of pre-defined locations of interest, which may correspond to the locations of customer sites (e.g., hospitals, clinics, patient's homes, customer's homes, super markets, oil platforms, grocery stores, automobile repair shops, and the like). The mobile application may also include a pre-defined threshold distance and a pre-defined threshold time. If a sales agent who is carrying an employee interface device that includes the mobile application moves within the pre-defined distance of one of the pre-defined locations of interest and stays within the pre-defined range for at least the pre-defined time period, then the mobile application may automatically send a signal to an internet-based database to "sign-in" the sales agent at that particular location of interest. Similarly, if the employee interface device moves outside the pre-defined distance of the pre-defined location for at least a pre-defined time period (e.g., when the sales agent leaves a customer site), the mobile application sends a "sign-out" time to the internet-based database. In an embodiment, a sales manager may use an information handling system, such as a manager interface device, to access an analytics dashboard application that includes data corresponding to which customer sites each sales agent visited during a user-defined time period and how long the sales agents remained at each customer site. Additionally, the internet-based database may enable the sales manager and/or the sales agent(s) to enter user-defined sales notes describing the details of each customer site visit.

The mobile application automatically tracks the movements of the sales agents, without the need for manual "punch clock" or bar code scanning devices to check in at various customer sites. A system for sales tracking using mobile devices helps increase the efficiency and effectiveness of a sales team by reducing the amount of manual administrative work required for the sales agents, while also providing the sales manager(s) with real-time analytics data that may be accessed remotely via an internet interface.

Figure 1:
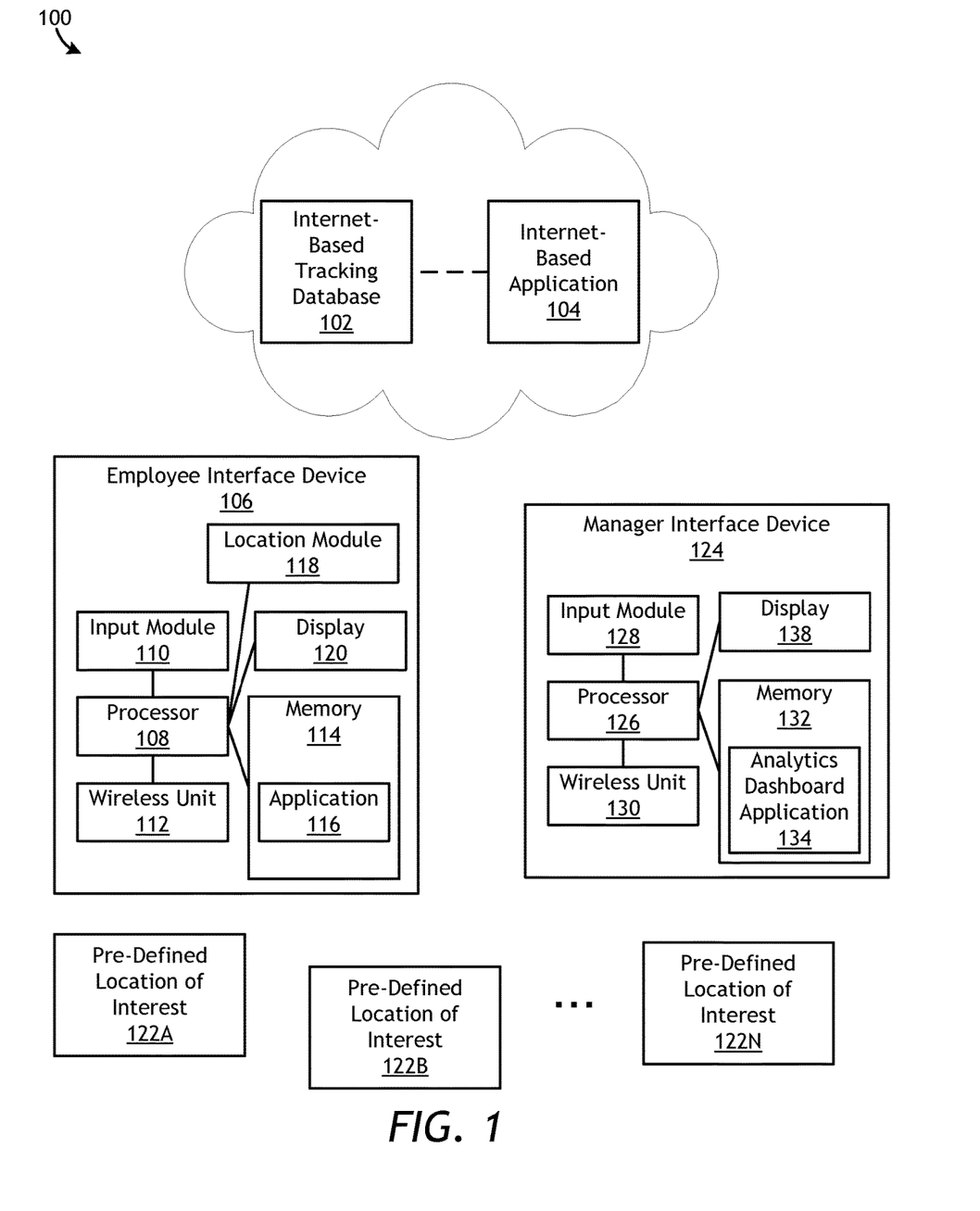
FIG. 1 is a schematic block diagram illustrating one embodiment of a system for sales tracking using mobile devices.

FIG. 1 is a schematic block diagram illustrating one embodiment of a system 100 for sales tracking using mobile devices. In one embodiment, system 100 may include an internet-based tracking database 102, an internet-based application 104, an employee interface device 106, one or more pre-defined locations of interest 122A-N, and a manager interface device 124. In an embodiment, internet based tracking database 102 may be configured to store multiple sign-in entries and sign-out times received from one or more mobile devices, such as employee interface device 106 via a wireless connection to the internet. In one embodiment, internet-based application 104 may be configured to access data (e.g., sign-in entries and sign-out times) from internet-based tracking database 102 and use the data to generate an analytics dashboard configured to be viewed by a user (e.g., a sales manager) of manager interface device 124.

In various embodiments, the pre-defined locations of interest 122A-N may include the locations of hospitals, clinics, patient's homes, customer's homes, super markets, oil platforms, grocery stores, automobile repair shops, or the like. For example, pre-defined locations of interest 122A-N may include the home addresses of one or more sick and/or elderly patients who receive periodic in-home visits from agents, such as in-home nurses or care providers. A system for sales tracking using mobile devices may thus be configured to automatically track the frequency and duration of the in-home care providers' visits to the stay at home patients. In another embodiment, a system for sales tracking using mobile devices may be configured to track the activities of sales agents, such as pharmaceutical representatives or medical device sales personnel, who visit clinics and/or hospitals. In other embodiments, a system for sales tracking using mobile devices may be configured to track the movement of delivery drivers, automobile parts sales people, cable television sales people, door to door election campaign volunteers, or the like.

In an embodiment, employee interface device 106 may include a processor 108 coupled to an input module 110, a wireless unit 112, a memory 114, a location module 118, and a display 120. In various embodiments, employee interface device 106 may be a mobile phone, smart phone, tablet, or other mobile device equipped with a location module. In various embodiments, location module 118 may include a Global Positioning System (GPS) module, a cellular phone tower triangulation module, a WiFi router logon tracking module, a WiMAX router logon tracking module, or the like. Location module 118 may thus utilize a variety of user location tracking methods, such as monitoring GPS data, calculating a current location based on triangulation from multiple cellular phone towers, and/or determining the position of a user at a location based on an employee interface device being close enough to logon (i.e., sign in) to a wireless router at a location of interest. In one embodiment, memory 114 may include an application 116 configured to enable a user (e.g., a sales agent or an in-home care provider) of employee interface device 106 to automatically track data corresponding to the user's visits to one or more of pre-defined locations of interest 122A-N. For example, if a user of employee interface device 106 carries employee interface device 106 within a pre-defined range of pre-defined location of interest 122A and stays within the pre-defined range (i.e., a distance threshold) of pre-defined location of interest 122A for an amount of time greater than a pre-defined time period (i.e., a time threshold) then application 116 may use wireless unit 112 to send a sign-in entry to internet-based tracking database 102, such that the sign-in entry includes an identifying name of pre-defined location of interest 122A, a sign-in time, and an identifying name of employee interface device 106 or the user of employee interface device 106. In one embodiment, processor 108 may utilize application 116 and location module 118 to determine when the pre-defined range and time threshold criteria are met by calculating the position (i.e., location) of employee interface device 106 with respect to the position of pre-defined location of interest 122A. Similarly, if the user of employee interface device 106 moves outside a pre-defined range of pre-defined location of interest 122A and stays outside the pre-defined range for a pre-defined time period, then application 116 may use wireless unit 112 to send a sign-out time corresponding to the sign-in entry to internet-based tracking database 102 for storage. Internet-based tracking database 102 and/or internet-based application 104 may thus calculate and store a value corresponding to the length of time that the user of employee interface device 106 stayed within the pre-defined range of pre-defined location of interest 122A (i.e., a visit time length). In an embodiment, a user of employee interface device 106 may also use input module 110 (e.g., a touch-screen keyboard) to enter notes or comments (e.g., sales notes or patient status attributes) corresponding to the sign-in entry, and application 116 may send the notes or comments via wireless unit 112 to internet-based tracking database 102 for storage with the sign-in entry data.

In one embodiment, a sales manager or other authorized user (e.g., a supervising physician) of an information handling system, such as manager interface device 124, may access internet-based application 104 and/or internet-based tracking database 102 to generate metrics reports, performance reports, analytics dashboards, or the like. In various embodiments, manager interface device may be a tablet, mobile phone, laptop computer, desktop computer, workstation, cloud server, or the like. In an embodiment, manager interface device 124 may include a processor 126 coupled to an input module 128, a wireless unit 130, a memory 132, and a display 138. In one embodiment, memory 132 may include an analytics dashboard application 134 configured to display metrics reports, performance reports, analytics dashboards, or the like. In another embodiment, the reports may be generated remotely by internet-based application 104 and viewed by manager interface device 124. In an embodiment, a user of manager interface device 124 may enter and/or edit notes or comments data corresponding to one or more entries in internet-based tracking database 102. In various embodiments, a user of manager interface device 124 may use analytics dashboard application 134 and/or internet-based application 104 to track the position-related and time-related movements of one or more users of mobile devices configured similarly to employee interface device 106 with respect to one or more pre-defined locations of interest 122A-N. In one embodiment, a user of manager interface device 124 may add new locations to a list of pre-defined locations of interest 122A-N stored in internet-based tracking database 102 if needed (e.g., if a new sales location should be added to an account focus list, or if the address of a new in-home care patient should be added to a remote patient list). Similarly, an authorized user of manager interface device 124 may remove one or more locations from the list of pre-defined locations of interest 122A-N if needed (e.g., if a sales location goes out of business or is removed from an account focus list).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 2:
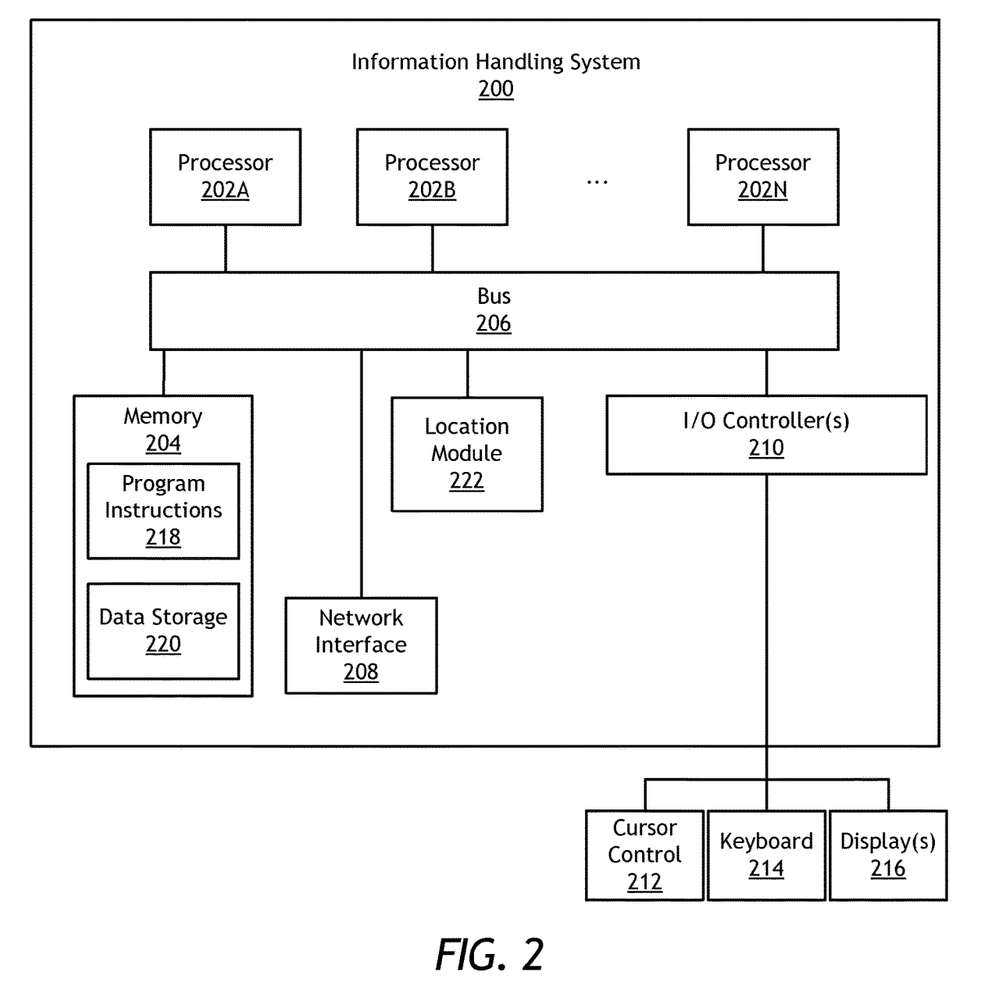
FIG. 2 is a schematic block diagram illustrating one embodiment of an Information Handling System (IHS) configured for sales tracking using mobile devices.

FIG. 2 is a schematic block diagram illustrating one embodiment of an Information Handling System (IHS) configured for sales tracking using mobile devices. In one embodiment, employee interface device 106 and/or manager interface device 124 of FIG. 1 may be implemented on an information handling system similar to IHS 200 described in FIG. 2. Similarly, employee interface devices 408 and 410 of FIG. 4 may be implemented on an information handling system similar to IHS 200 described in FIG. 2. Analytics dashboard application 502 of FIG. 5 may also be implemented on an information handling system similar to the IHS 200. In various embodiments, IHS 200 may be a server, a mainframe computer system, a workstation, a network computer, a desktop computer, a laptop, or the like.

As illustrated, IHS 200 includes one or more processors 202A-N coupled to a system memory 204 via bus 206. In an embodiment, IHS 200 may include a location module 222 coupled to bus 206. In various embodiments, location module 222 may include a GPS module, a cellular phone tower triangulation module, a WiFi router logon tracking module, a WiMAX router logon tracking module, or the like. In one embodiment, IHS 200 further includes network interface 208 coupled to bus 206, and input/output (I/O) controller(s) 210, coupled to devices such as cursor control device 212, keyboard 214, and display(s) 216. In some embodiments, a given entity (e.g., employee interface device 106 or manager interface device 124) may be implemented using a single instance of IHS 200, while in other embodiments multiple such information handling systems, or multiple nodes making up IHS 200, may be configured to host different portions or instances of embodiments (e.g., internet-based tracking database 102 or internet-based application 104).

In various embodiments, IHS 200 may be a single-processor information handling system including one processor 202A, or a multi-processor information handling system including two or more processors 202A-N (e.g., two, four, eight, or another suitable number). Processor(s) 202A-N may be any processor capable of executing program instructions. For example, in various embodiments, processor(s) 202A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s)

202A-N may commonly, but not necessarily, implement the same ISA. Also, in some embodiments, at least one processor(s) 202A-N may be a graphics processing unit (GPU) or other dedicated graphics-rendering device.

System memory 204 may be configured to store program instructions and/or data accessible by processor(s) 202A-N. For example, memory 204 may be used to store software program and/or database shown in FIG. 3 and/or FIG. 5. In various embodiments, system memory 204 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 204 as program instructions 218 and data storage 220, respectively. In other embodiments, program instructions and/or data may be received, sent or stored upon different types of IHS-accessible media or on similar media separate from system memory 204 or IHS 200. Generally speaking, a IHS-accessible medium may include any tangible, non-transitory storage media or memory media such as electronic, magnetic, or optical media—e.g., disk or CD/DVD-ROM coupled to IHS 200 via bus 206, or non-volatile memory storage (e.g., "flash" memory).

The terms "tangible" and "non-transitory," as used herein, are intended to describe an IHS-readable storage medium (or "memory") excluding propagating electromagnetic signals, but are not intended to otherwise limit the type of physical IHS-readable storage device that is encompassed by the phrase IHS-readable medium or memory. For instance, the terms "non-transitory IHS readable medium" or "tangible memory" are intended to encompass types of storage devices that do not necessarily store information permanently, including for example, random access memory (RAM). Program instructions and data stored on a tangible IHS-accessible storage medium in non-transitory form may further be transmitted by transmission media or signals such as electrical, electromagnetic, or digital signals, which may be conveyed via a communication medium such as a network and/or a wireless link.

In an embodiment, bus 206 may be configured to coordinate I/O traffic between processor 202, system memory 204, and any peripheral devices including network interface 208 or other peripheral interfaces, connected via I/O controller(s) 210. In some embodiments, bus 206 may perform any necessary protocol, timing or other data transformations to convert data signals from one component (e.g., system memory 204) into a format suitable for use by another component (e.g., processor(s) 202A-N). In some embodiments, bus 206 may include support for devices attached through various types of peripheral buses, such as a variant of the Peripheral Component Interconnect (PCI) bus standard or the Universal Serial Bus (USB) standard, for example. In some embodiments, the operations of bus 206 may be split into two or more separate components, such as a north bridge and a south bridge, for example. In addition, in some embodiments some or all of the operations of bus 206, such as an interface to system memory 204, may be incorporated directly into processor(s) 202A-N.

Network interface 208 may be configured to allow data to be exchanged between IHS 200 and other devices, such as other information handling systems attached to employee interface device 106 manager interface device 124, internet-based tracking database 102, and/or internet-based application 104, for example. In various embodiments, network interface 208 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 210 may, in some embodiments, enable connection to one or more display terminals, keyboards, keypads, touch screens, scanning devices, voice or optical recognition devices, or any other devices suitable for entering or retrieving data by one or more IHS 200. Multiple input/output devices may be present in IHS 200 or may be distributed on various nodes of IHS 200. In some embodiments, similar I/O devices may be separate from IHS 200 and may interact with IHS 200 through a wired or wireless connection, such as over network interface 208.

As shown in FIG. 2, memory 204 may include program instructions 218, configured to implement certain embodiments described herein, and data storage 220, comprising various data accessible by program instructions 218. In an embodiment, program instructions 218 may include software elements of embodiments illustrated in FIG. 3 and FIG. 5. For example, program instructions 218 may be implemented in various embodiments using any desired programming language, scripting language, or combination of programming languages and/or scripting languages. Data storage 220 may include data that may be used in these embodiments such as, for example, application 116 and/or analytics dashboard application 134. In other embodiments, other or different software elements and data may be included.

A person of ordinary skill in the art will appreciate that IHS 200 is merely illustrative and is not intended to limit the scope of the disclosure described herein. In particular, the information handling system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other information handling system configurations.

Embodiments of internet-based tracking database 102 and/or internet-based application 104 described in FIG. 1, FIG. 3, FIG. 4, and FIG. 5 may be implemented in an information handling system that is similar to IHS 200. In one embodiment, the elements described in FIG. 1, FIG. 3, FIG. 4, and FIG. 5 may be implemented in discrete hardware modules. Alternatively, the elements may be implemented in software-defined modules which are executable by one or more of processors 202A-N, for example.

Figure 3:
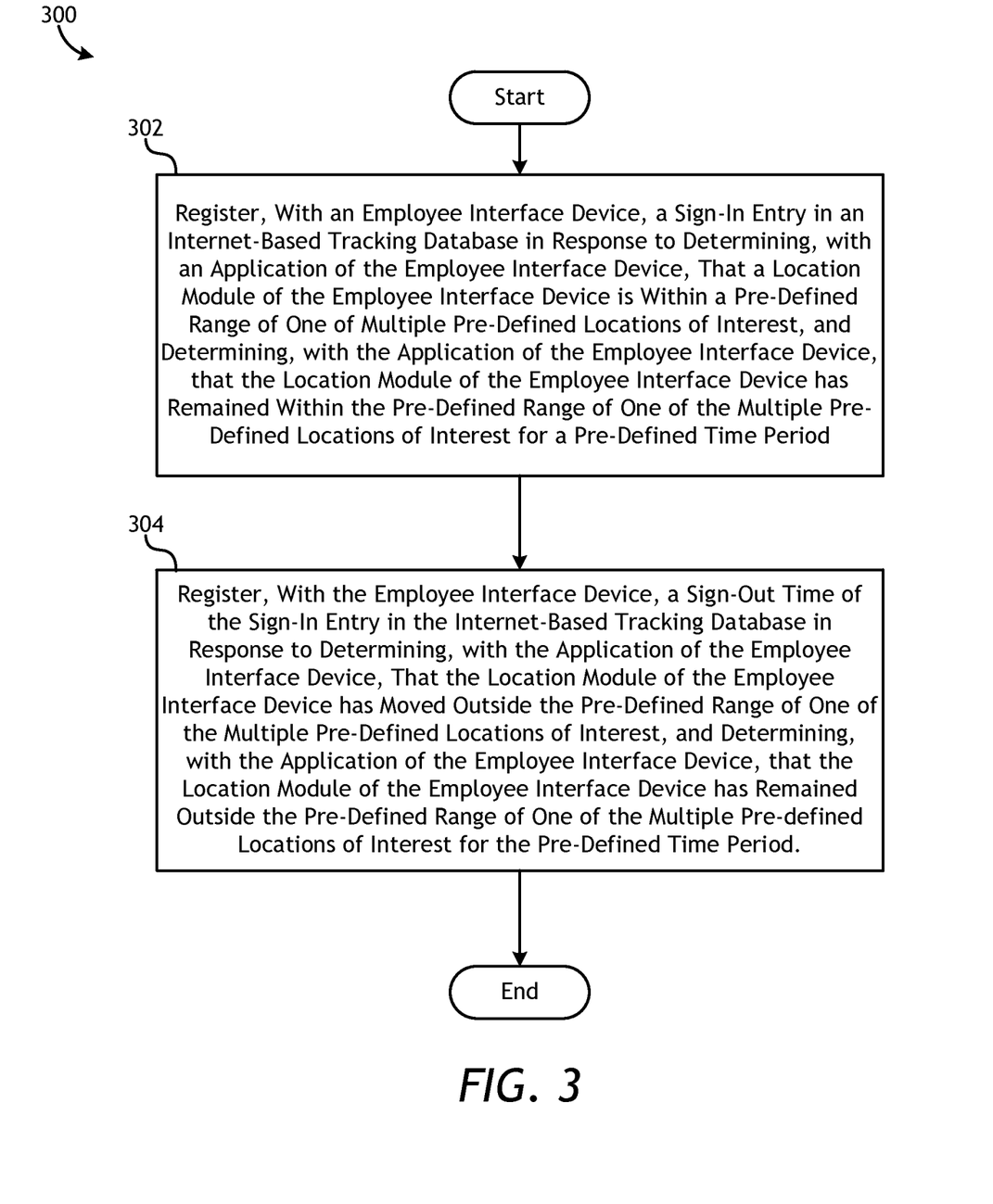
FIG. 3 is a schematic flowchart diagram illustrating one embodiment of a method for sales tracking using mobile devices.

FIG. 3 is a schematic flowchart diagram illustrating one embodiment of a method 300 for sales tracking using mobile devices. At block 302, the method 300 includes registering, with an employee interface device (e.g., employee interface device 106 of FIG. 1), a sign-in entry in an internet-based tracking database (e.g., internet-based tracking database 102 of FIG. 1) in response to determining, with an application of the employee interface device, that a location module of the employee interface device is within a pre-defined range of one of multiple of pre-defined locations of interest, and determining, with the application of the employee interface device, that the location module of the employee interface device has remained within the pre-defined range of one of the multiple pre-defined locations of interest for a pre-defined time period.

As depicted in block 304, the method 300 includes registering, with the employee interface device, a sign-out time of the sign-in entry in the internet-based tracking database in response to determining, with the application of the employee interface, that the location module of the employee interface device has moved outside the pre-defined range of one of the multiple pre-defined locations of interest, and determining, with the application of the employee interface device, that the location module of the employee interface device has remained outside the pre-defined range of one of the multiple pre-defined locations of interest for the pre-defined time period.

In an alternate embodiment, the application may use additional criteria, such as a rate of movement or relative speed of the employee interface device with respect to one of the pre-defined locations of interest to dynamically adjust the sign-out time of a sign-in entry. For example, if an employee interface device has already triggered an automatic sign-in event by moving within the pre-defined range of a location of interest and remaining within the range for a pre-defined time period, but then the employee interface device moves outside the pre-defined range of the location of interest at a high rate of speed (e.g., a rapid departure at a rate that exceeds a pedestrian speed threshold) then the application may dynamically record a sign-out time in advance of the pre-defined time period for remaining outside the pre-defined range of the pre-defined location of interest. In this embodiment, the application may record a sign-out time dynamically if the rate of speed of the employee interface device is high enough to suggest a rapid departure via automobile. For example, if the user of a mobile device leaves the location of interest quickly in an automobile and thus has a minimal chance of returning in the short term, then a sign-out time may be dynamically recorded by the application.

Figure 4:
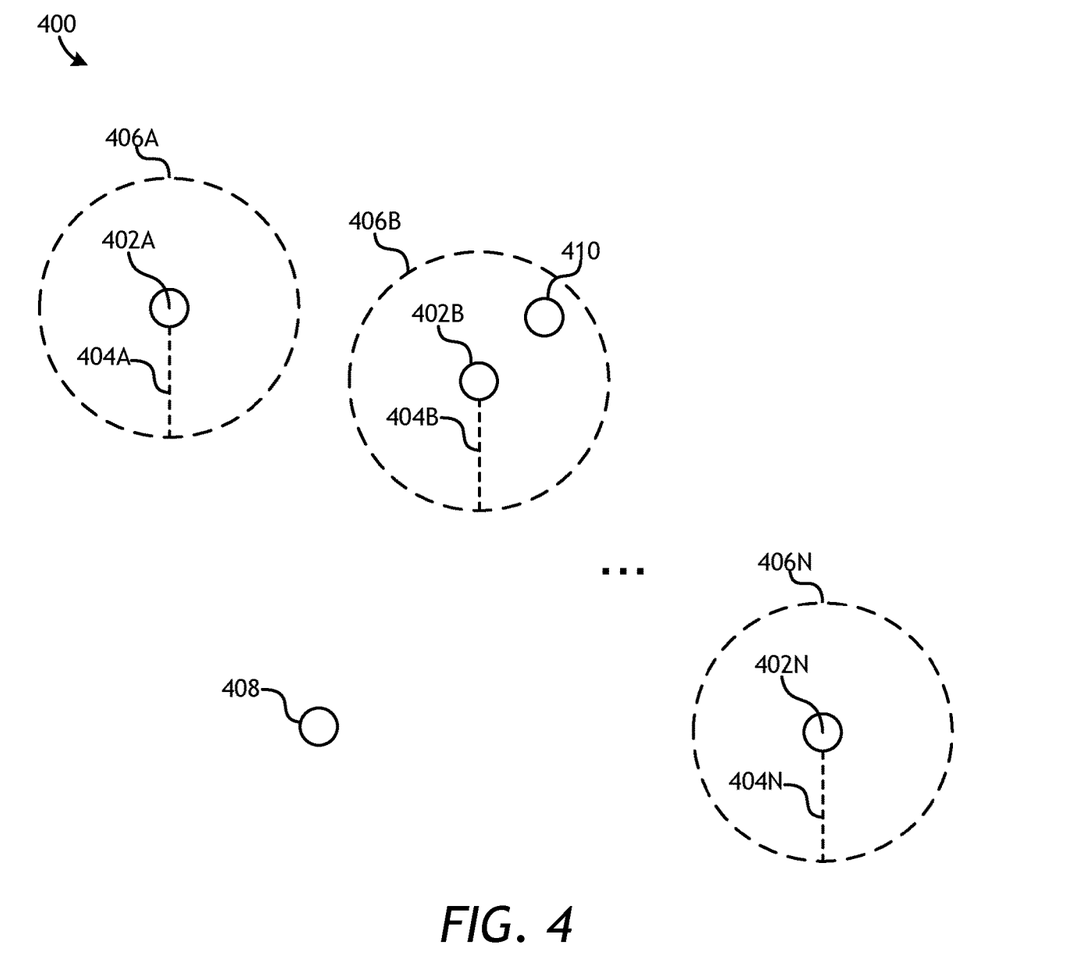
FIG. 4 is a schematic block diagram illustrating one embodiment of an apparatus for sales tracking using mobile devices.

FIG. 4 is a schematic block diagram illustrating one embodiment of an apparatus 400 for sales tracking using mobile devices. In an embodiment, apparatus 400 may include one or more pre-defined locations of interest 402A-N based on location data (e.g., GPS data, cellular phone tower triangulation data, WiFi router login data, and/or WiMAX router login data) stored in an internet-based database. A pre-defined radius 404A-N may extend virtually from each of the pre-defined locations of interest 402A-N to define a corresponding pre-defined range 406A-N (i.e., a distance threshold for each location of interest). In one embodiment, apparatus 400 may also include one or more mobile employee interface devices, such as employee interface device 408 and employee interface device 410. As depicted, the position (i.e., location) of employee interface device 408 is currently outside all of the pre-defined ranges 406A-N. The user of employee interface device 408 is thus not making a visit to any of the pre-defined locations of interest 402A-N and has therefore not automatically triggered a sign-in event in the internet-based database. Conversely, the position of employee interface device 410 is currently located within pre-defined range 406B. An application installed on employee interface device 410 may thus determine that the user of employee interface device 410 is making a visit to pre-defined location of interest 402B if employee interface device 410 stays within pre-defined range 406B for a pre-defined time period, and then the application stored on employee interface device 410 may automatically send a sign-in signal to an internet-based database with information corresponding to the name of pre-defined location of interest 402B and a sign-in time-stamp.

Figure 5:
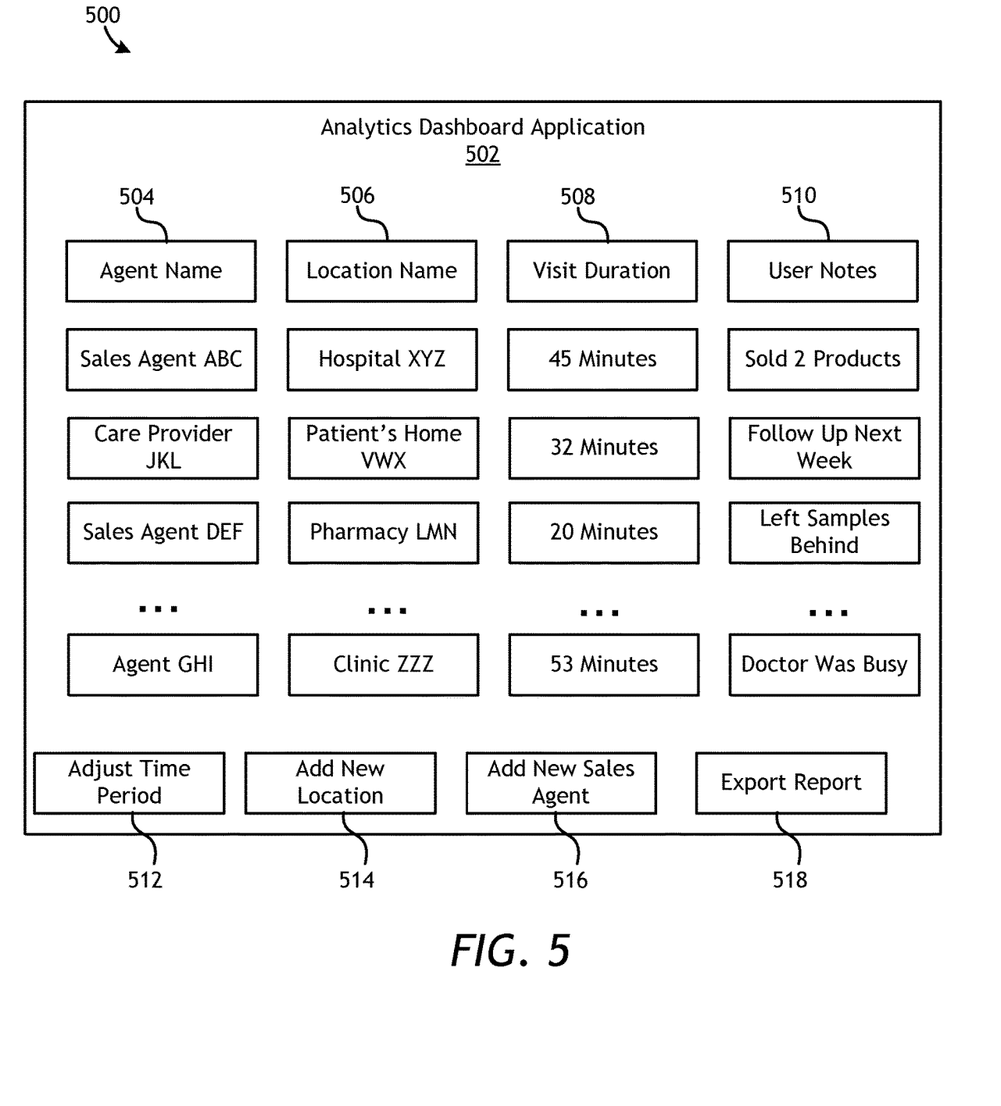
FIG. 5 is a schematic block diagram illustrating one embodiment of an application for sales tracking using mobile devices.

FIG. 5 is a schematic block diagram illustrating one embodiment of an application 500 for sales tracking using mobile devices. In an embodiment, application 500 may include an analytics dashboard application 502 configured to organize and display multiple columns of data, such as an agent name column 504, a location name column 506, a visit duration column 508, and a user notes column 510, on a manager interface device (e.g., manager interface device 124 of FIG. 1). In various embodiments, the manager interface device may be a tablet, mobile phone, laptop computer, desktop computer, workstation, cloud server, or the like. In one embodiment, analytics dashboard application 502 may include multiple rows with data corresponding to multiple agents (i.e., employees), such that an agent's name and/or user identification number may appear multiple times if the agent made multiple visits within an adjustable time period. In various embodiments, agents may include sales agents, care providers, delivery drivers, doctors, nurses, physician's assistants, or the like. In an embodiment, analytics dashboard application 502 may also include one or more virtual control buttons configured to allow an authorized user of the dashboard (e.g., a manager) to adjust the view or perform certain administrative operations. In various embodiments, analytics dashboard application 502 may include an "adjust time period" button 512, an "add new location" button 514, an "add new sales agent" button 516, an "export report" button 518, or the like.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains"

one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method of using a mobile device to reduce false sign-ins during sales tracking, comprising:
   determining, with an application on the mobile device, whether the mobile device is within a predefined range of a first one of a plurality of pre-defined locations of interest;
   initiating a timer in response to determining, with the application on the mobile device, whether the mobile device is within a predefined range of a first one of a plurality of pre-defined locations of interest;
   assessing the occurrence of a first sign-in by determining, with the application on the mobile device, whether the mobile device has remained within the pre-defined range of the first one of the plurality of pre-defined locations of interest for a first pre-defined threshold time period;
   sending a first sign-in entry to an internet-based tracking database if it is determined, with the application on the mobile device, that the mobile device has remained within the pre-defined range of the first one of the plurality of pre-defined locations of interest for the first pre-defined threshold time period;
   resetting the timer if it is determined, with the application on the mobile device, that the mobile device has not remained within the pre-defined range of the first one of the plurality of pre-defined locations of interest for the first pre-defined threshold time period;
   determining, with the application on the mobile device, whether the mobile device is within a predefined range of a second one of a plurality of pre-defined locations of interest, if the mobile device has not remained within the pre-defined range of the first one of the plurality of pre-defined locations of interest for the first pre-defined threshold time period;
   initiating a timer in response to determining, with the application on the mobile device, whether the mobile device is within a predefined range of the second one of a plurality of pre-defined locations of interest;
   assessing the occurrence of a second sign-in by determining, with the application on the mobile device, whether the mobile device has remained within the pre-defined range of the second one of the plurality of pre-defined locations of interest for a second pre-defined threshold time period;
   sending a second sign-in entry to the internet-based tracking database if it is determined, with the application on the mobile device, that the mobile device has remained within the pre-defined range of the second one of the plurality of pre-defined locations of interest for the second pre-defined threshold time period; and
   resetting the timer if it is determined, with the application on the mobile device, that the mobile device has not remained within the pre-defined range of the second one of the plurality of pre-defined locations of interest for the second pre-defined threshold time period.

2. The method of claim 1, further comprising:
   assessing whether a first sign-in entry has been sent to the internet-based tracking database;
   determining, with the application on the mobile device, whether the mobile device has moved outside the pre-defined range of the first one of the plurality of pre-defined locations of interest;
   assessing whether the mobile device has remained outside the pre-defined range of the first one of the plurality of pre-defined locations of interest for a third pre-defined threshold time period; and
   sending a sign-out entry to the internet-based tracking database if the mobile device has remained outside the pre-defined range of the first one of the plurality of pre-defined locations of interest for the third pre-defined threshold time period.

3. The method of claim 2, wherein the first and second sign-in entry each comprise:
   a location name corresponding to one of the plurality of locations of interest;
   an amount of time the employee interface device spent within the predefined range of the corresponding location of interest; and
   a user-editable sales notes field.

4. The method of claim 3, wherein the user-editable sales notes field is configured to be automatically uploaded to a customer relationship management (CRM) system by the internet-based tracking database.

5. The method of claim 4, further comprising reading, with a manager interface device, a plurality of sign-in entries from the internet-based tracking database.

6. The method of claim 5, further comprising sending a real-time proximity alert to a site administrator of a pre-defined location of interest in response to the mobile device sending one of said first or second sign-in entry to the internet-based tracking database.

7. The method of claim 6, wherein the pre-defined range comprises fifty (50) feet and the pre-defined threshold time period comprises fifteen (15) minutes.

8. The system of claim 6, further comprising a manager interface device, wherein the manager interface device comprises an analytics dashboard application configured for reading a plurality of sign-in entries from the internet-based tracking database.

9. The method of claim 2 further comprising the step of:
   dynamically adjusting the third pre-defined threshold time period based on a rate of movement of the mobile device with respect to one of the pre-defined locations of interest.

10. The method of claim 1 wherein the first pre-defined threshold time period and the second pre-defined threshold time period are the same time period.

* * * * *